March 12, 1946.  A. B. MODINE  2,396,522
RADIATOR TUBE CONSTRUCTION
Filed April 19, 1943
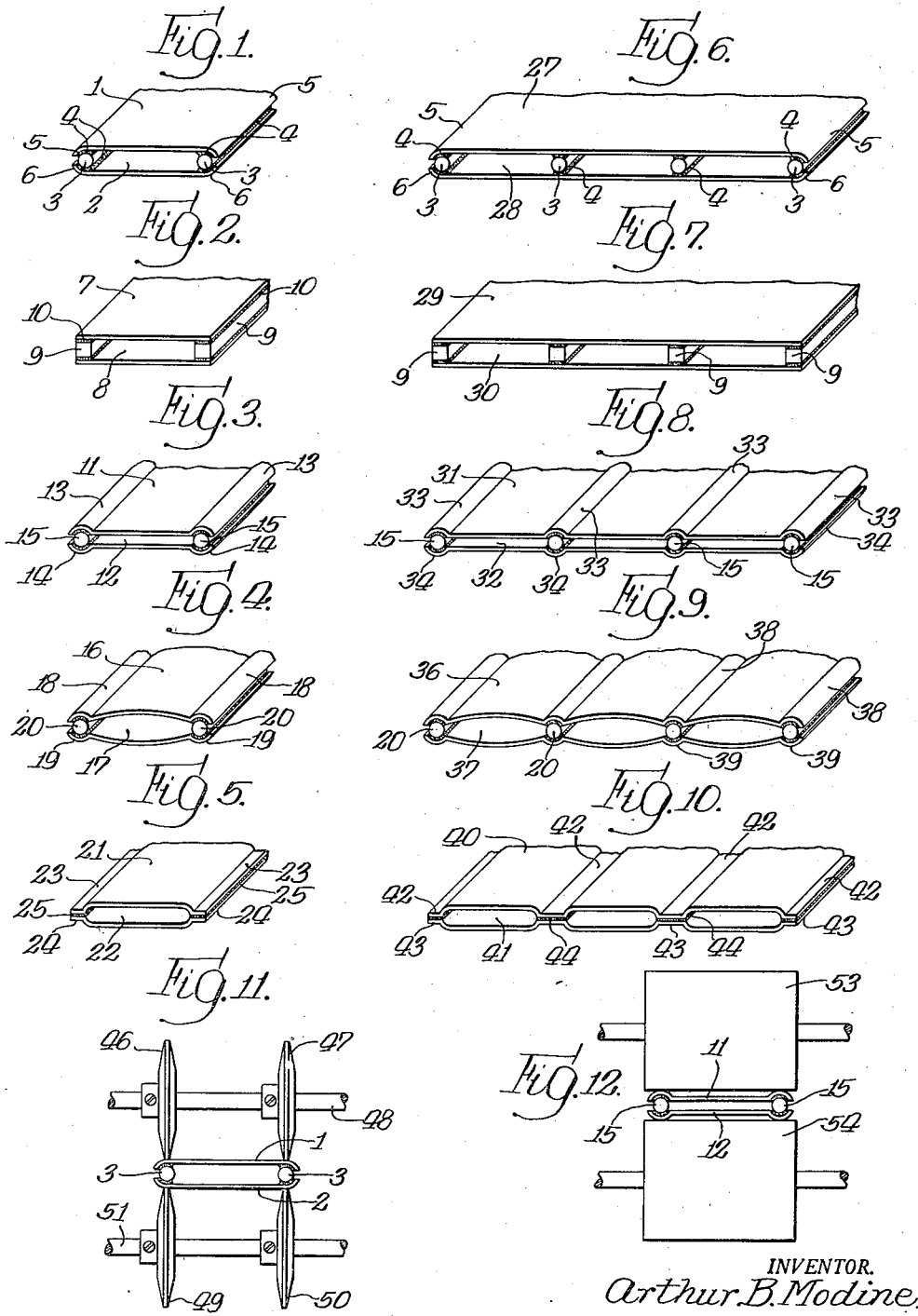
INVENTOR.
Arthur B. Modine,
BY
Attys.

Patented Mar. 12, 1946

2,396,522

UNITED STATES PATENT OFFICE 2,396,522

RADIATOR TUBE CONSTRUCTION

Arthur B. Modine, Racine, Wis., assignor to Modine Manufacturing Company, Racine, Wis., a corporation of Wisconsin Application April 19, 1943, Serial No. 483,582

6 Claims. (Cl. 138—47)

The present invention is directed to the production of a radiator tube or heat interchanger tube for high pressure or high temperature installations. It has been the practice to use seamless tubing for the production of core units for the purpose of coping with high pressures or with high temperature. It has become a problem, however, to produce a tube or tubes which can be adapted for use in such units or installations as airplane coolers or superchargers, engine cooling units, and so on. For these purposes certain requirements must be met, such as a minimum weight with a maximum amount of strength under the pressure and temperature conditions designated. The tubes of the present construction have been devised for use in installations which are subjected to a temperature condition ranging approximately from 200 to 300 degrees Fahrenheit.

One of the objects of the present invention is to produce a tube or heat interchanger unit which is and can be manufactured at a considerable saving when the tubes of the present design are utilized in place of seamless tubes in particular installations requiring such tubes. The tubes of the different designs shown are preferably made of brass, but other metals such as copper or ferrous metal may also be used. The choice of metals will depend on the strength needed and the amount of flexibility wanted in the tube walls.

Another object of the present invention is to provide a tube for various heat exchange units, which may be made of copper or brass joined together with suitable bonding material, such as silver solder, inserted in the proper places for joining the various tube elements together and subjecting the assembled arrangement to the necessary heat for producing the bonding of the parts. It is also possible to use suitable means for directly welding the tube parts and spacers together to form the completed tube construction, which results in an intimate fusion of the parts as may be readily determined and practiced by using certain specific metals to fit the kinds of tube materials and their specific uses. It is also possible to use a combination of metal to metal fusing and silver solder or other bonding means could be added if such should be desirable.

Another object of the present invention is to provide certain apparatus which is particularly applicable for quickly and easily fabricating the tubes of the present design.

All other objects and advantages shall hereinafter appear in the following detailed description of the various disclosed embodiments of the present invention, reference being had to the accompanying drawing illustrating the same.

In the drawing:

Figs. 1 to 5 inclusive illustrate fragmentary perspective views of single tube structures showing different modifications of the various parts which can be combined to form tubes that embody the principles of the present invention;

Figs. 6 to 10 inclusive are similar fragmentary perspective illustrations of tubes corresponding respectively to those illustrated in Figs. 1 to 5 inclusive, with the exception that the tubes illustrated in the latter figures are of multiple construction;

Fig. 11 is a diagrammatic view of a welding method that can be employed for joining the tube parts together, and Fig. 12 illustrates a modified continuous heating method for carrying out the production of the tubes in joining the parts thereof together.

In certain of the constructions of tubes for the purposes herein described it may be desirable to omit the strips or wire pieces for spacing the metal walls of such tubes. With some metals it will be necessary to supply brazing or bonding mediums and in other cases metals may be utilized which will not require bonding mediums. And, as hereinbefore stated, it is also possible to use various combinations of the foregoing to produce a tube that will serve the purpose in various heat exchange units or installations that may be subjected to relatively high temperatures and wherein the tubes are also subjected to relatively high pressures. The different forms of spacing wires may be supplemented by some brazing or welding alloy, or such wires may be coated with such alloys.

One form of tube is illustrated in Fig. 1, which is a single tube comprising the sheet metal walls 1 and 2 supported in spaced relation by means of the wires 3 with suitable bonding or brazing material such as 4 interposed between the foregoing parts for joining the same. The tube wall 1 is provided with curved edges such as 5 while the tube wall 2 has similar edges such as 6, which edges all act to provide a greater area of contact between the walls or sides of the tubes and the spacing elements or wires 3.

Fig. 2 illustrates another form of tube having flat sides or walls 7 and 8 joined in spaced relation to each other by means of square rods or wires 9, with suitable brazing or bonding material 10 forming the joining medium between the respective parts.

In Fig. 3 the tube shown is made by the use of the sides or walls 11 and 12 having the beaded edges 13 and 14 respectively for straddling the spacing members or wires 15. In the form illustrated in Fig. 4, the side or wall members 16 and 17 are bowed centrally and such walls are provided along their edges with the beads 18 and 19 respectively for straddling the spacing elements or wires 20.

In the construction illustrated in Fig. 5, suitable walls or sheet metal sides 21 and 22 have been provided with offset ledges 23 and 24 respectively, and the latter are joined by a suitable brazing or soldering alloy 25 to form the completed tube. It will be noted that in the tube in Fig. 5, the spacing elements or wires such as illustrated in the forms in Figs. 1 to 4 inclusive, have been eliminated and supplanted by any suitable alloy.

In the illustrations of the multiple tube constructions in Figs. 6 to 10 inclusive, it is readily apparent that the multiple form of tubes are substantially the same as the single form of tubes with the exception that additional spacing elements have been used to increase the number of fluid chambers in such tubes and that the outer sheet metal portions thereof have been formed to accommodate the spacing elements in the manner shown. Fig. 6, therefore, illustrates larger surface members or walls 27 and 28, separated by the spacing elements 3, and the edge portions of the outer walls are also turned in as at 5 and 6 respectively, as in the single form of tube to partially encircle the spacing wires 3, and all of the parts are joined by the use of the bonding material 4.

In Fig. 7, 29 and 30 represent the walls of the tube while spacers 9 provide the closure members and dividers of the tube.

In Fig. 8, 31 and 32 represent the wall portions of the tube which are each provided with spaced beads 33 and 34 respectively for accommodating the spacing elements 15.

In Fig. 9 the multiple tube consists of the two outer metal walls 36 and 37 of bowed sections outlined by means of the beads 38 and 39 respectively. In this case the spacing elements or wires 20 are straddled by the beads of the walls in the same manner as in the case of the single tube shown in Fig. 4, and the side walls are bowed outwardly in the same manner.

Fig. 10 is provided with outer walls 40 and 41, having the depressed ledges 42 and 43 respectively which are joined by suitable bonding material 44. This construction also eliminates spacing elements as does the tube illustrated in Fig. 5.

One of the advantages in manufacturing the different tubes of the present invention is that the same can be suitably assembled and joined or bonded by running the tube assemblies through heating elements as a continuous process.

Figs. 11 and 12 have been added to diagrammatically show two ways in which the tube parts may be assembled and joined together into a rigid unit adapted for subsequent use in the construction of heat exchange devices operating under high temperature and pressure conditions.

In Fig. 11, the welding rolls 46 and 47 are mounted for rotation on any suitable means such as shaft 48, and these rolls are vertically aligned with the welding rolls 49 and 50 carried by another shaft 51. A tube assembly such as illustrated in Fig. 1 is shown between the rolls and in the process of being joined or fused together under the action of a controlled electric current that may be suitably induced into the opposite sets of welding rolls. With the use of the welding rolls bonding material need not be used, but can be supplied in the form of a suitable alloy if desired.

In this method of fusing the tube parts together, the current could be so regulated as to flow through the tube parts, building up sufficient heat by the combination of the resistance of the tube and the amount of current applied to produce a fusing or welding temperature. Obviously, any number of welding rolls may be used to provide a fusion unit for suitably joining together the parts of the multiple units illustrated in Figs. 6 to 10 inclusive. It is also possible to introduce any form of pressure means capable of maintaining the welding rolls in welding contact with the tube parts being fused.

The method of joining the tube parts, as illustrated in Fig 12, involves the use of a pair of superimposed rolls 53 and 54 which can be suitably heated internally or externally in any known manner. In this case a tube, such as illustrated in Fig. 3, is shown as passing between the rolls for the purpose of obtaining a bonded combination of the tube parts. The rolls 53 and 54 may be made of any required lengths or may be sectionalized for accommodating multiple tubes.

In the forms of tubes illustrated in Figs. 3, 4, 8 and 9, it is possible to obtain better self alignment and control of the positioning of the spacing elements with respect to the outer tube walls when running such tubes through the continuous bonding process.

In the forms illustrated in Figs. 5 and 10, it is also an advantage to use the spaced welding rolls as illustrated in Fig. 11, whereby such superimposed rolls would help to guide the tube walls in superimposed relation. In this form of tube the rolls can ride in the troughs 42 and 43 thereby providing a means for better controlling the alignment of the tube parts.

In carrying out the objects of the above invention it is, therefore, possible to provide various metallic tubes which can be fabricated from separate parts and which will serve the purpose of seamless tubes under the conditions of temperature and pressure referred to. The leeway possible in using different outer or tube skin metals and different metallic spacing elements, together with the possibility of fusing chosen metals directly or by joining the same through the use of a separate bonding medium are features that are here put to good use and are extremely valuable in the present tube constructions.

Having thus described the present invention, it is obvious that various immaterial modifications may be made without departing from the breadth and scope of the present invention. Therefore, no limitations should be placed on the exact form, construction, arrangement and combination of parts herein shown and described or to the uses mentioned excepting as shall be determined by the breadth and scope of the appended claims.

What I claim as new and desire to secure by Letters Patent is:

1. A tube for a heat exchange device comprising a pair of separate walls, a plurality of spacer elements interposed between and bonded to said walls to hold the same in spaced relation, said walls having portions overlapping said spacer elements with the edges of the walls aligned with respect to each other and aligned with respect to said spacer elements.

2. A tube for a heat exchange device comprising a pair of separate walls, a plurality of spacer elements interposed between said walls to hold the same in spaced relation, said walls having portions thereof formed with opposing concave beads at and paralleling their edges to partially surround and clasp said spacer elements whereby to align the edges of the walls with respect to each other and with respect to said spacer elements, and bonding material bonding said spacer elements to said walls to join all of said tube parts together.

3. A tube for a heat exchange device comprising a pair of separate walls, a plurality of spacer members for disposing said walls in fixed spaced relation to each other and for joining said walls, said walls having beads overlapping and clasping said spacer members, and bonding means arranged along the juncture of said members to join said walls fixedly together.

4. A tube for a heat exchange unit comprising a pair of wall members, a plurality of wires disposed in parallel spaced relation between said wall members, some of which are disposed at the edge portions of said wall members, and the walls being formed with beads clasping said wires, and bonding material interposed between each of said beads and said wires for bonding all of said tube parts together.

5. A tube for a heat exchange unit comprising wall members, a plurality of wire members interposed in parallel spaced relation between said wall members to separate the latter and to divide the space between said members into fluid chambers, two of said wire members being disposed between the edge portions of said wall members, and the walls being formed with beads partially surrounding and clasping said wires, and a bonding alloy for securing said wall members and wire members together.

6. A tube for radiator cores comprising a pair of substantially flat side walls, several wire spacers interposed in parallel spaced relation between said side walls, two of which wire spacers are disposed at the edge portions of the side walls to seal the edge portions of said walls and all of said wire spacers serving to provide liquid passageways between the side walls, the latter being formed with beads to partially surround and clasp the wire spacers, said wires being spaced to make each passageway long and narrow transversely whereby said side wall portions between the wire spacers are free to flex under extreme internal pressure conditions.

ARTHUR B. MODINE.